(12) United States Patent
Mewhinney

(10) Patent No.: US 6,804,346 B1
(45) Date of Patent: Oct. 12, 2004

(54) STAGED PREDICTIVE DIALING SYSTEM

(75) Inventor: Brian E. Mewhinney, Carmel, IN (US)

(73) Assignee: Interactive Intelligence, Inc., Indianapolis, IN (US)

(*) Notice: Subject to any disclaimer, the term of this patent is extended or adjusted under 35 U.S.C. 154(b) by 345 days.

(21) Appl. No.: 09/616,083

(22) Filed: Jul. 13, 2000

Related U.S. Application Data (60) Provisional application No. 60/186,487, filed on Mar. 2, 2000, and provisional application No. 60/143,460, filed on Jul. 13, 1999.

(51) Int. Cl.$^7$ ................................................ H04M 3/00
(52) U.S. Cl. ............................. 379/265.1; 379/266.07; 379/266.08
(58) Field of Search .................. 379/265.01–265.14, 379/266.01, 266.1, 309, 201

(56) References Cited

U.S. PATENT DOCUMENTS

| | | | |
|---|---|---|---|
| 4,829,563 A | 5/1989 | Crockett et al. ............. 379/309 |
| 4,858,120 A | 8/1989 | Samuelson .................. 364/401 |
| 4,881,261 A | 11/1989 | Oliphant et al. ............ 379/215 |
| 5,179,589 A | 1/1993 | Syu .............................. 379/265 |
| 5,214,688 A | 5/1993 | Szlam et al. .................. 379/67 |
| 5,327,490 A | 7/1994 | Cave ........................... 379/216 |
| 5,341,412 A | 8/1994 | Ramot et al. ................. 379/92 |
| 5,343,518 A | 8/1994 | Kneipp ........................ 379/355 |
| 5,390,243 A | 2/1995 | Casselman et al. ......... 379/265 |
| 5,436,965 A * | 7/1995 | Grossman et al. .......... 379/266 |
| 5,546,456 A | 8/1996 | Vilsoet et al. .............. 379/265 |
| 5,553,133 A | 9/1996 | Perkins ....................... 379/265 |
| 5,561,711 A | 10/1996 | Muller ........................ 379/266 |
| 5,570,419 A | 10/1996 | Cave et al. ................. 379/216 |
| 5,592,543 A | 1/1997 | Smith et al. ................ 379/265 |
| 5,621,790 A | 4/1997 | Grossman et al. .......... 379/266 |
| 5,640,445 A | 6/1997 | David ......................... 379/113 |
| 5,889,799 A | 3/1999 | Grossman et al. .......... 379/266 |
| 5,926,528 A | 7/1999 | David ......................... 379/113 |
| RE36,416 E | 11/1999 | Szlam et al. ............. 379/88.09 |
| 5,999,617 A * | 12/1999 | Oyanagi et al. ............ 379/265 |
| 6,466,664 B1 * | 10/2002 | Zhao ...................... 379/266.08 |
| 6,473,799 B1 * | 10/2002 | Takeshita et al. ........... 379/265 |

* cited by examiner

Primary Examiner—William J. Deane, Jr.
(74) Attorney, Agent, or Firm—Woodard, Emhardt, Moriarty, McNett & Henry LLP (57) ABSTRACT

A method, apparatus, and system places outbound calls using a predictive dialer at a call center and, optionally, receives inbound calls. The predictive dialing components use information about the substantive stage of the active calls at a given point in time to decide whether to begin to dial another outbound call. The calls that are considered may be inbound or outbound. In one form of the invention, statistics are maintained regarding each agent's passage through the various stages of an active call, then the statistics are used to control the predictive dialer.

28 Claims, 5 Drawing Sheets

STAGED PREDICTIVE DIALING SYSTEM

REFERENCE TO RELATED APPLICATION

Benefit is claimed under 35 U.S.C. § 119(e) based on U.S. Provisional Patent <Application No. 60/143,460, filed on Jul. 13, 1999, and on U.S. Provisional Patent Application No. 60/186,487, filed on Mar. 2, 2000, each of which is hereby incorporated by reference in its entirety, as if fully set forth herein.

BACKGROUND

This invention relates generally to communication systems, and more particularly to communication systems with a "predictive dialing" feature.

In a call center, a call center agent typically communicates with customers through inbound calls, outbound calls, or both. This communication is often by voice using a telephone handset or headset component of the agent's workstation. Usually, the workstation also includes a computer terminal or personal computer to interface with various application modules. These modules provide the agent with information directed to the particular customer service involved. In one common application, a customer's account information is provided on a display viewable by the agent.

The time it takes agents to handle calls and the lapse of time between calls influence the efficiency of call center operations. Further, it is generally desirable to provide for customers as favorable an impression as possible with regard to call center contacts and transactions. It is also often desirable to provide these customers and prospective customers, who are already in contact with an organization, information regarding additional goods or services in which they might also be interested. To address each of these priorities, however, adds to the variability in the total time an agent takes to handle a call. Even the time required to complete a single successful sale of a product or service can vary widely due to a customer's questions, unusual situation, or special requests. To manage such competing interests, there is a continuing demand for further advancements in the call center technology area.

SUMMARY

One form of the present invention is a unique system for attempting to establish new communication links with customers or prospective customers based on the substantive progress of communications with individuals currently connected to the system. In another form, a predictive dialer bases outbound dialing decisions at least in part on current or recent information concerning the substantive stage of calls then in progress (such as an offer phase, acceptance phase, question-and-answer phase, and closing phase). In some such forms, the agent is presented with a telemarketing script on a video display to guide his or her information presentation and collection. The substantive stage of a call in some such systems is inferred from the navigational commands and data input made by the agent via the scripting system. In other systems, the agent explicitly generates signals to the system to notify the system of the substantive status of the agent's current phone call.

Further forms, objects, features, aspects, benefits, advantages, and embodiments of the present invention shall become apparent from the detailed description and drawings provided herewith.

DETAILED DESCRIPTION OF SELECTED EMBODIMENTS

For the purpose of promoting an understanding of the principles of the invention, reference will now be made to the embodiments illustrated in the drawings, and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

In the example embodiment to be discussed in the following paragraphs, a call center accepts inbound and makes outbound telephone calls to and from customers and prospects (collectively "customers" herein) for an organization. The call center is equipped with both automatic call-handling equipment (an interactive voice response (IVR) system, voicemail system, and fax-back system) and live agents. A portion of the call center operation involves outbound calling of prospective customers, or customers whose accounts are overdue, for example. This function uses a predictive dialing unit to automatically attempt to dial and reach these persons with minimal (if any) involvement by a live person. When deciding whether or when to attempt to place one or more additional outbound calls, the predictive dialing unit takes into account the substantive status of calls already in progress.

Figure 1:
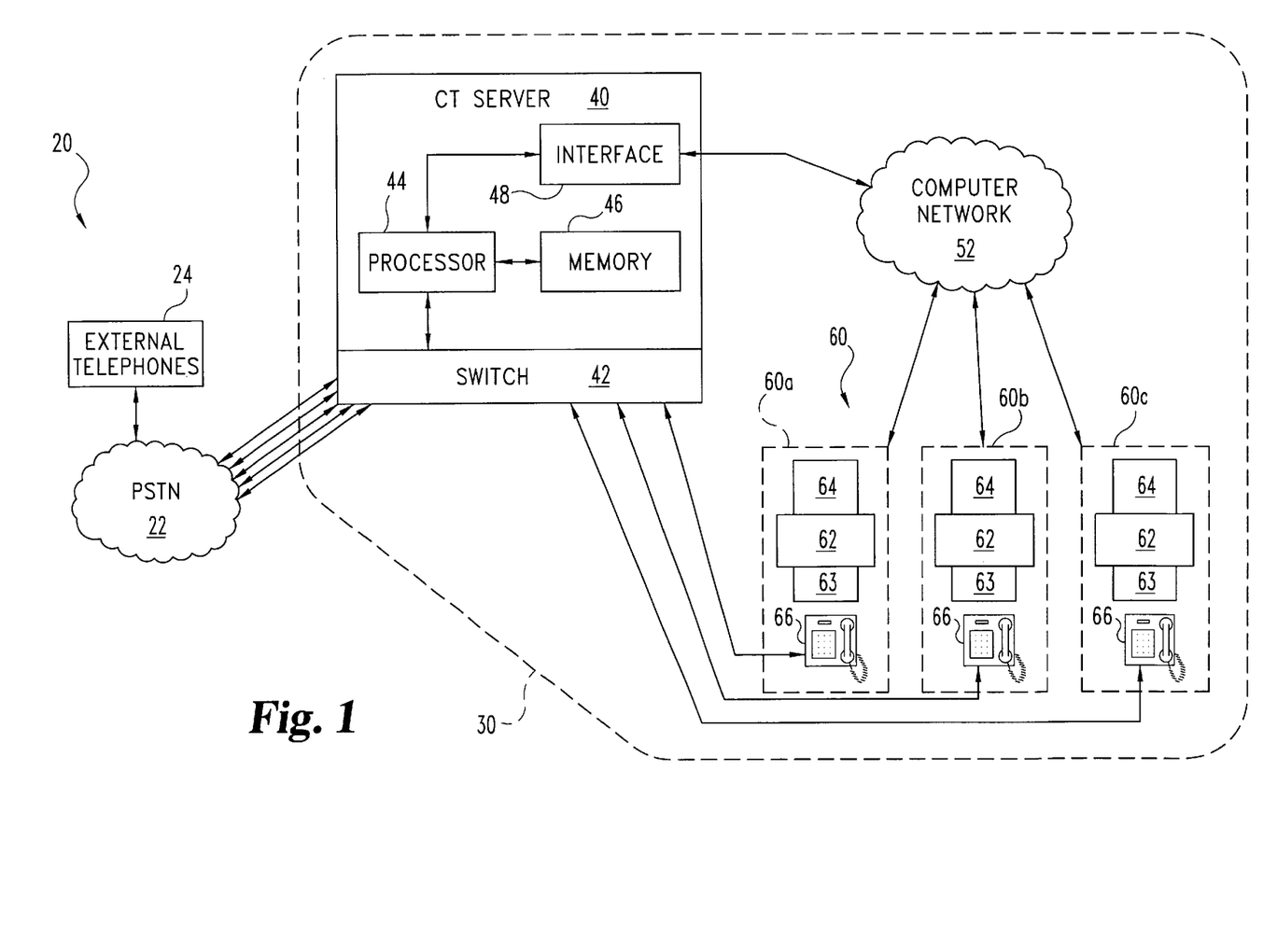
FIG. 1 is a schematic view of a system according to one embodiment of the present invention.

FIG. 1 schematically illustrates call center system 20 of one embodiment of the present invention. System 20 includes Public Switched Telephone Network (PSTN) 22 operatively coupled to a number of external telephones 24 and call center 30. Call center 30 includes Computer Telephony (CT) server 40 with telecommunications switch 42 coupled to PSTN 22 via lines 32. Server 40 also includes processor 44, memory 46, and network interface 48. Network interface 48 is operatively coupled to computer network 52.

It should be understood that server 40 may include more than one processor or CPU and more than one type of memory; where memory 46 is representative of one or more types. Furthermore, it should be understood that while one server 40 is illustrated, more servers may be utilized in alternative embodiments. Processor 44 may be comprised of one or more components configured as a single unit. Alternatively, when of a multi-component form, processor 44 may have one or more components located remotely relative to the others. One or more components of processor 44 may be of the electronic variety defining digital circuitry, analog circuitry, or both. In one embodiment, processor 44 is of a conventional, integrated circuit microprocessor arrangement, such as one or more PENTIUM II or PENTIUM III processors supplied by INTEL Corporation of 2200 Mission College Boulevard, Santa Clara, Calif., 95052, USA. For this embodiment, switch 42 can be in the form of one or more telephone communication processing boards provided by DIALOGIC of 1515 Route Ten, Parsippany, N.J., 07054, USA.

Memory 46 may each include one or more types of solid-state electronic memory, magnetic memory, or optical memory, just to name a few. By way of non-limiting example, memory 46 may include solid-state electronic Random Access Memory (RAM), Sequentially Accessible Memory (SAM) (such as the First-In, First-Out (FIFO) variety or the Last-In First-Out (LIFO) variety), Programmable Read Only Memory (PROM), Electrically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types. Also, memory 46 may be volatile, nonvolatile, or a hybrid combination of volatile and nonvolatile varieties.

Network 52 may be in the form of a Local Area Network (LAN), Wide Area Network (WAN) such as the Internet, or other network type as would occur to those skilled in the art. Also coupled to network 52 are a number of agent workstations 60a, 60b, 60c (collectively designated agent stations 60). Agent workstations each include workstation computer 62 coupled to display 64. Each workstation 60 may also include one or more operator input devices (collectively designated 63) such as a keyboard, mouse, track ball, light pen, and/or microphone, to name just a few representative examples. Also, besides display 64, one or more other output devices may be included such as loudspeaker(s) and/or a printer.

Each workstation 60 further includes a telephone unit 66 as schematically illustrated in FIG. 1. Telephone units 66 may be in the form of a handset, headset, or other arrangement as would occur to those skilled in the art. Workstations 60 may be arranged identically to one another or may differ from one to the next as would occur to those skilled in the art. In one common arrangement, one workstation is designated for an agent supervisor that has different capabilities than those of other workstations. Furthermore, it should be understood that more or fewer workstations may be utilized than those illustrated.

Under the control of CT server 40, switch 42 is configured as a predictive dialer (as discussed below), and may also be configured to operate as a Private Branch Exchange (PBX), Automatic Call Distributor (ACD), a combination of these, or another switching configuration as would occur to those skilled in the art. Alternatively or additionally, system 20 may be arranged to provide for the coordination, conversion, and distribution of a number of different forms of communication, such as telephone calls, voicemail, faxes, e-mail, web chats, web-call backs, and the like. Furthermore, business/customer data associated with various communications may be stored in memory 46 and selectively accessed by one or more workstations 60. This data may be presented at the workstation 60 on a corresponding display 64.

Figure 2:
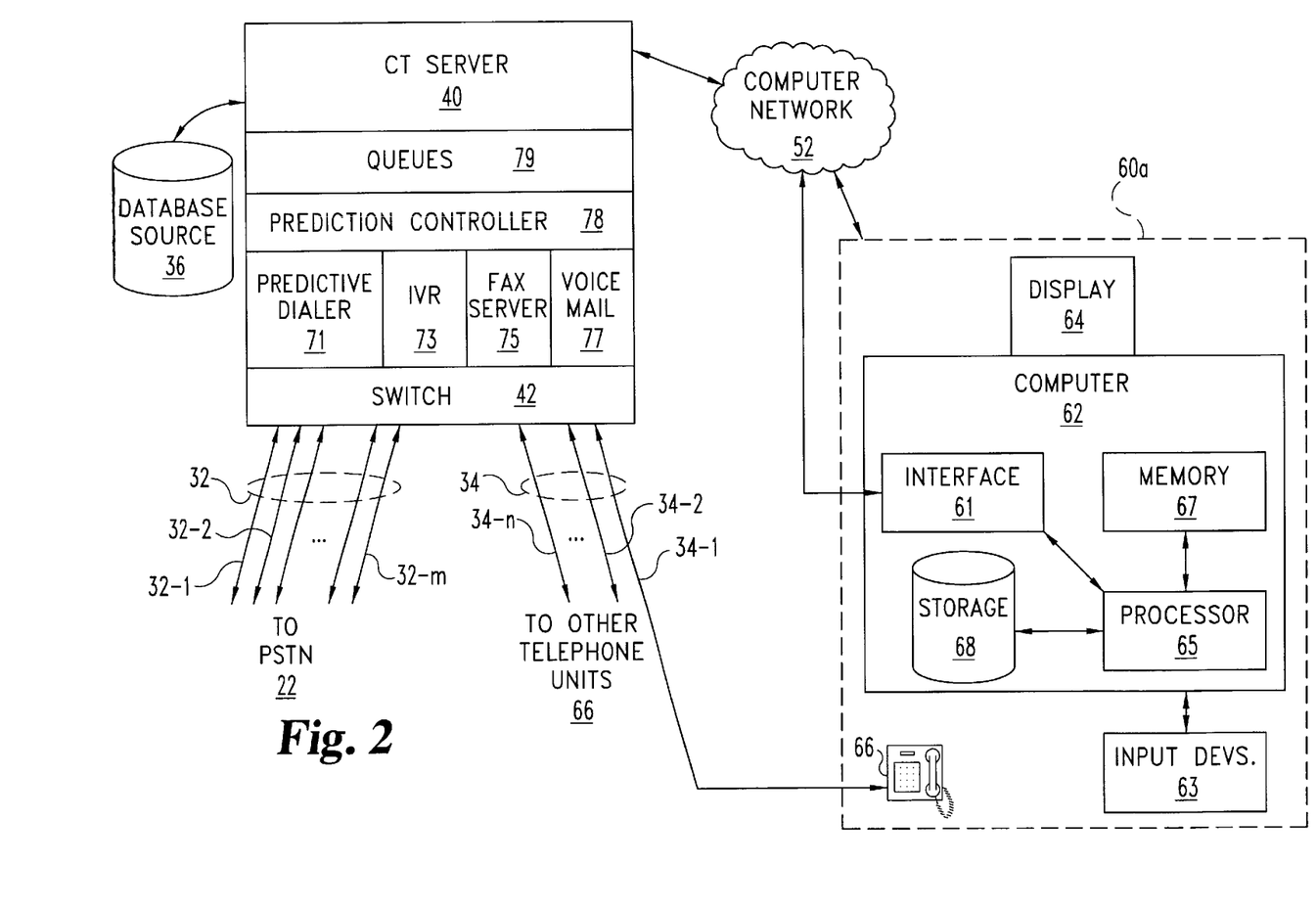
FIG. 2 is a functional block diagram of a communication server and an agent terminal.

With continuing reference to elements shown in FIG. 1, and also with reference to additional detail shown in FIG. 2, more specific aspects of this embodiment will be discussed. Certain elements shown in FIG. 1 are also shown in FIG. 2 (using common reference numerals), while additional components that are either implemented by, complementary to, or separate from the elements shown in FIG. 1 are given different reference numerals. In the exemplary system shown in FIG. 2, external telephone lines 32-1 to 32-m (collectively designated lines 32) connect PSTN 22 to switch component 42 of CT server 40. Each of lines 32 is capable of carrying incoming or outgoing calls for call center 30. For example, a customer may make an inbound call that is connected to call center 30 via line 32-1. CT server 40 answers the call and controls switch 42 to connect the call to interactive voice response (IVR) unit 73. Information is collected from and/or given to the customer by IVR 73 using methods known in the art. For example, IVR 73 can provide a menuing system responsive to DTMF signals to provide a customer with current account information. In addition, one or more databases (such as database source 36) may be consulted to obtain part or all of that information.

If the customer requests a facsimile transmission of, for example, a specification sheet or account status confirmation, CT server 40 provides the necessary information to fax server component 75, which sends the requested facsimile transmission using, for example, line 32-2. In other circumstances, CT server 40 may allow a customer to leave a voicemail message using voicemail component 77. If the customer has difficulty navigating the system, or has an inquiry or request that cannot be handled by automated means, CT server 40 connects the customer with an agent by using switch 42 to link the incoming line 32-1 with a selected internal telephone line from internal lines 34 (individually designated 34-1, 34-2, . . . 34-n). An available agent at workstation 60a receives the call on telephone unit 66 and assists the customer. A call that connects an agent and a caller is referred to herein as an "active call." "Substantive progress" of an active call refers to the state, among a plurality of states, of the discussion between the parties to the call, as determined with reference to the content of the discussion.

Close to the time that the customer's call is routed to workstation 60a (and preferably before it is so routed), information related to the customer (such as an account number, name, calling history, account status, etc.) is read from database source 36 and provided to the agent by CT server 40 or other source (such as a database in memory 46 or elsewhere). As the call progresses, the agent and the customer may discuss basic account information, current contact information for the account, additional services that may be provided, expansion of a line of credit, and other matters requiring more or less of the agent's time.

Figure 3A:
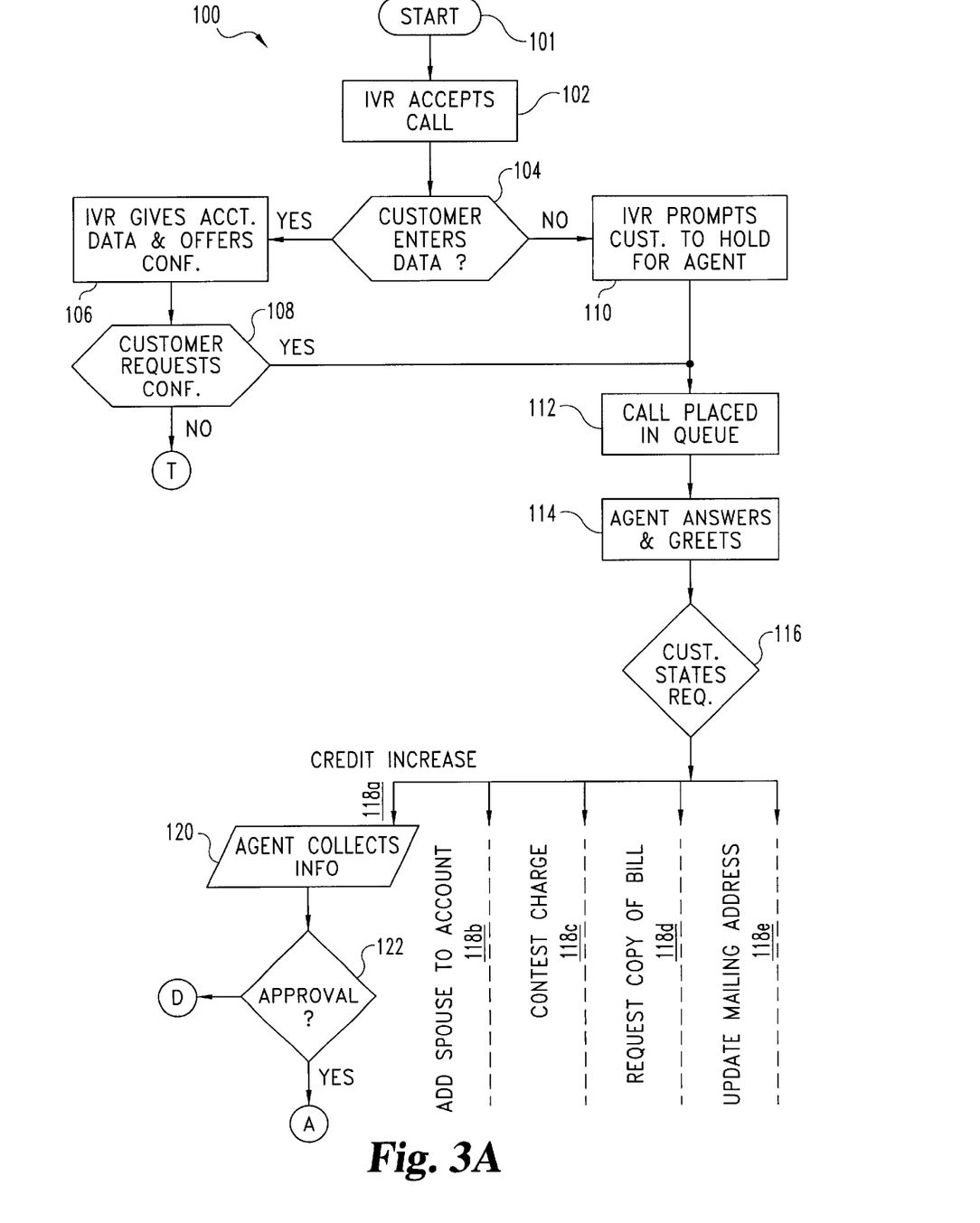
FIGS. 3A–3B is a flow chart of an exemplary incoming call.
Figure 3B:
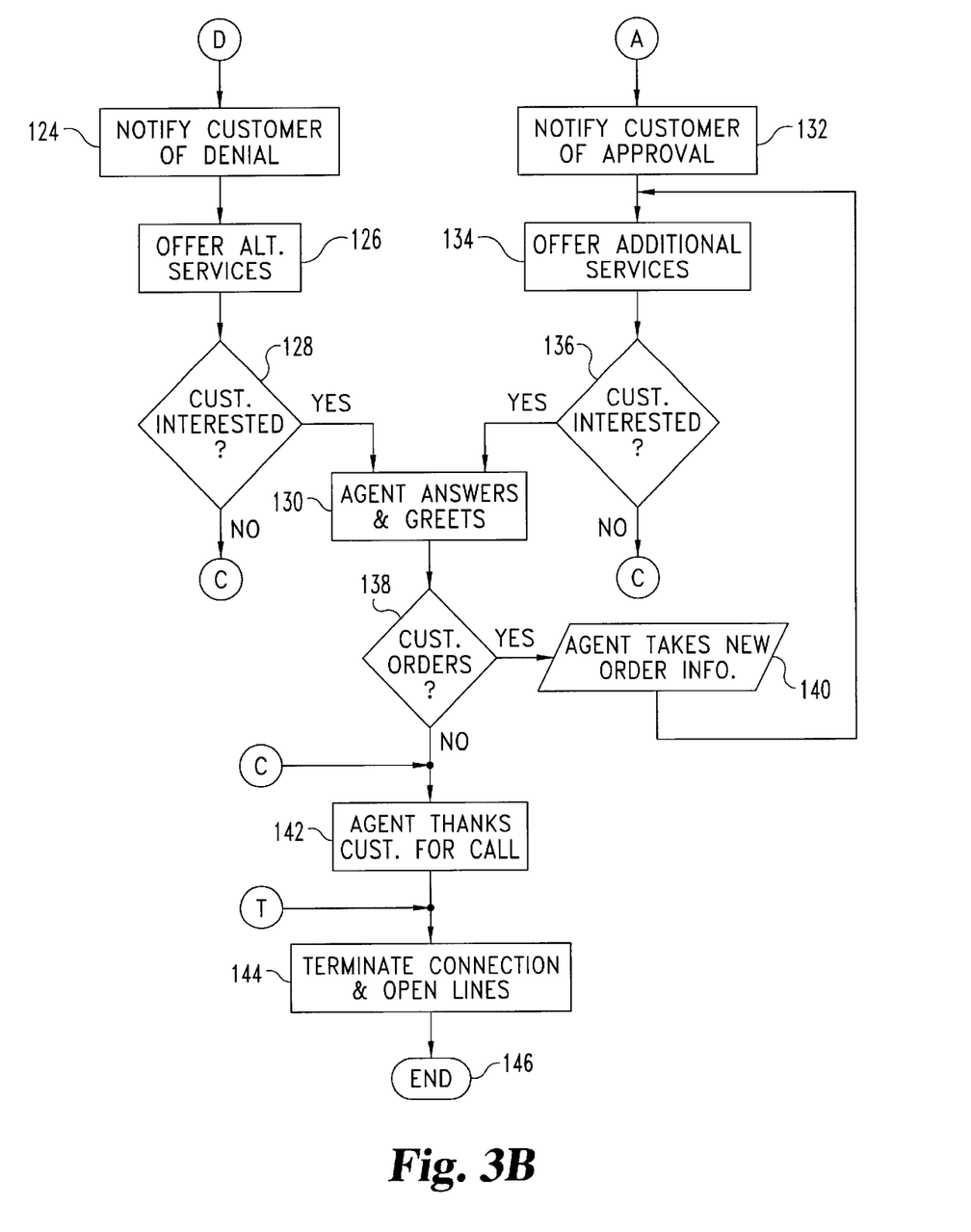

The flow of one such exemplary call is shown in FIGS. 3A and 3B. This exemplary call begins at start point 100. The IVR system accepts the call at block 102 and requests the entry of an account number by the customer. IVR unit 73 determines at decision block 104 whether the customer has entered a valid account number. If so, the IVR unit 73 gives the customer account data and offers the opportunity to speak with a customer service representative at block 106. IVR 73 then determines at block 108 whether the customer has accepted that offer. If not, the process proceeds to point T (discussed below) to terminate the call.

If the customer is determined at decision block 104 not to have entered valid account data, then the IVR unit 73 prompts the customer at block 110 to hold for a live agent. At that point, or if the customer is determined at decision block 108 to have requested a conference with an agent, the call is placed in a holding queue at block 112. When an agent becomes available, the call is connected to the agent (for example, via line 34-3), and the agent answers and greets the customer at block 114, then asks for the customer's request.

The customer states his or her request at decision block 116, and an appropriate branch is taken based on that request. As an example, if the customer requests a credit increase, path 118a is taken. (Though only branch 118a will be discussed herein in further detail, processes to be followed in response to other customer requests can easily be determined by those skilled in the art.) If the customer asks to add the name of a spouse to an account, path 118b is followed. If the customer wishes to contest a charge to his account, the path marked 118c is followed; and if the customer requests an additional copy of a bill, then path 118d is followed. Alternatively, if the customer requests to update the mailing address on his account, the path denoted 118e is followed. Other procedures (paths) may be established for other requests, depending on the operational needs of a given call center.

The process of branch 118a will now be described in further detail. The agent collects additional information necessary to evaluate the credit increase request at information block 120. The decision is made whether to approve the increase at decision block 122. If an approval is granted, the process continues at point A (see FIG. 3B); and if it is denied, the process continues at point D (see FIG. 3B).

Turning to FIG. 3B, we resume at point D. The agent notifies the customer of the denial at block 124, but offers alternative services at block 126, explaining the various features of the alternative offerings. The customer decides at block 128 whether he is interested in the alternative services. If not, the method proceeds to closing at point C, described below. If, however, the customer is interested in the additional services (as determined at decision block 128), the agent answers any additional questions about those additional services that the customer might have (block 130).

If, on the other hand, credit is approved at decision block 122, the process proceeds into FIG. 3B at point A, and the agent notifies the customer of the approval at block 132. The agent offers additional services at block 134. Again, the customer determines whether he or she is interested in the additional services at decision block 136. If not, the process proceeds to closing at point C (described below). If, however, the customer is interested in the additional services (as determined at decision block 136), the agent answers questions regarding the additional services at block 130. The customer determines at decision block 138 whether to order the additional services. If the customer does order the services, the agent takes any new information necessary to complete the order at block 140; the process then resumes with an offer of still additional services at block 134. If the customer decides at decision block 138 not to order additional services, or if a closing was indicated at decision block 128 or decision block 136, the agent thanks the customer for the call at block 142. The system then terminates the connection and opens lines 32-1 and 34-3 for new calls at block 144. The process ends at block 146.

It can be seen from the above example that, depending on the preferences and needs of the customer, the length of calls can vary dramatically. For example, many calls may terminate by a negative decision at block 108, but some calls will proceed through offers, questioning phases, and additional purchases during repeated passes through blocks 134, 130, and 140, respectively.

It was discussed above that one aspect of the operation of call center 30 is outbound calling. Generally, predictive dialing unit 71 of CT server 40 obtains telephone numbers and other relevant data for customers to be called from data source 36. Predictive dialer 71 places calls via one or more of outside lines 32 using the calling information. If an appropriate individual is reached on a call, the call is preferably transferred to telephone unit 66 of an available agent using one of internal lines 34. If no agents are immediately available, preliminary processing may be done (such as playing a prerecorded announcement or greeting, or collecting account information from the customer) using IVR-type functions of CT server 40 while the call is placed in a queue through queuing unit 79 to wait for an agent to become available. One aspect of the present invention relates to prediction controller 78, which triggers predictive dialer 71 to make such calling attempts as discussed herein.

In the present exemplary embodiment, after an outbound call is transferred to telephone unit 66 of a workstation 60 that is staffed by an available agent, the agent follows a telemarketing script in order to inform the customer or prospective customer about the offer and to entice the customer or prospective customer to purchase certain goods or services. These scripts are displayed on display unit 64, preferably using individualized data that CT server 40 forwards to the workstation 60a by way of computer network 52 and interface device 61. The scripts are preferably stored at workstation 60a in storage unit 69, then retrieved as needed by processor 65. Processor 65 also executes programming instructions from storage 69 and/or memory 67 that enable processor 65 to control the operations of computer 62, including managing interface device 61, providing output on display 64, and accepting input via input devices 63.

As the agent presents the scripted material, the agent scrolls through pages of text on display 64 using input devices 63, and navigates a decision tree based on the customer/prospect's responses to the presentation.

Figure 4:
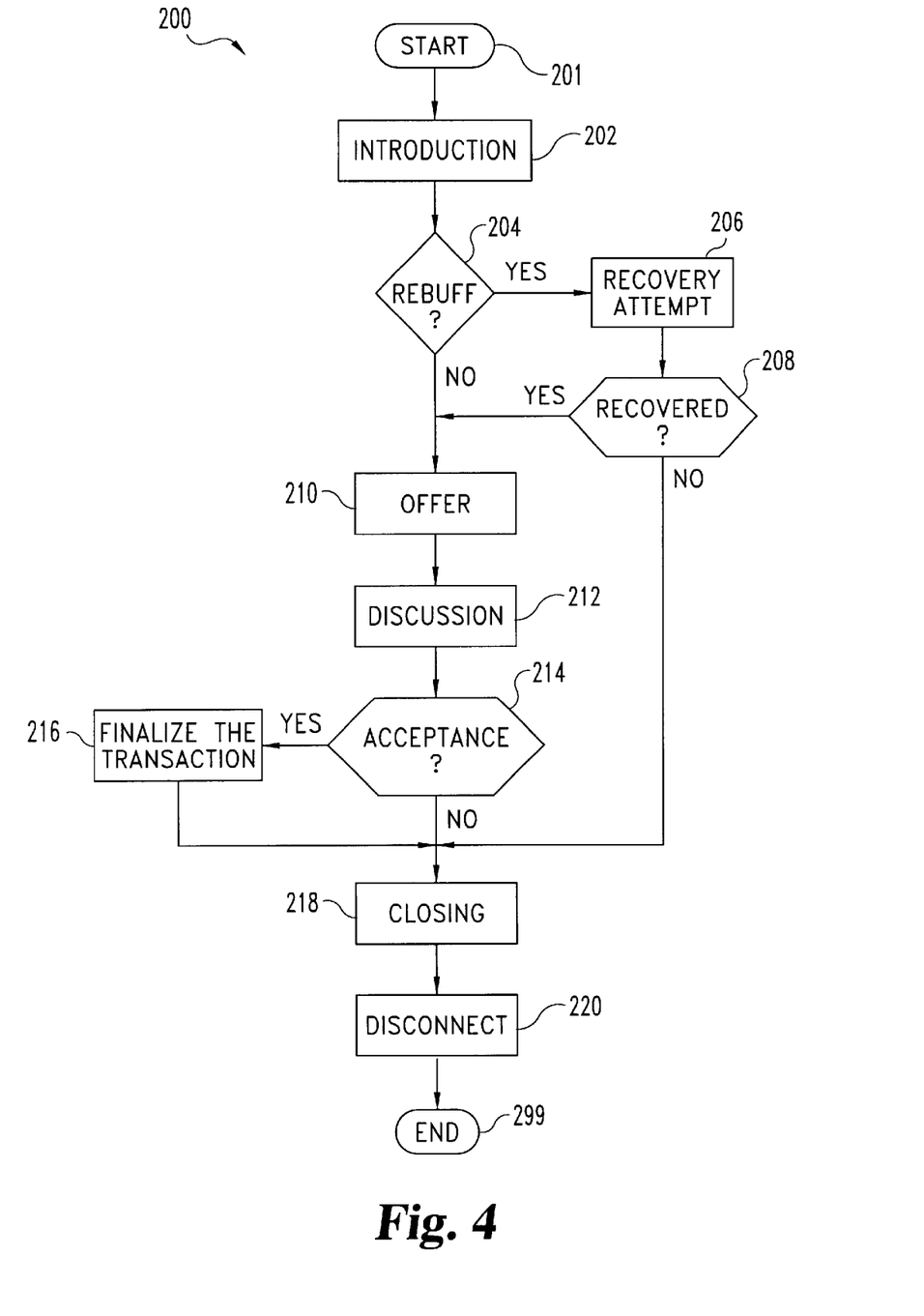
FIG. 4 is a flow chart of an exemplary outgoing call.

An overview of the stages of an exemplary outbound telemarketing call is provided in, and will now be discussed with reference to, process 200 in FIG. 4. The process for each connected call begins at start block 201. The agent introduces the call at block 202 by identifying himself and the company on whose behalf the call is being made. If the individual being called rebuffs the attempted contact (decision block 204), the agent attempts to "recover" the contact by insisting on the beneficial nature of the call and highlighting the benefits (block 206). If the recovery attempt is successful (decision block 208), or if this prospect did not rebuff the initial introduction at decision block 204, the offer is given at block 210. The agent then discusses the details of the offer and answers the prospect's questions about the offer at block 212, and the prospect decides (decision block 214) whether to accept the offer. If the offer is accepted at decision block 214, the transaction is finalized at block 216 by the taking of any additional, necessary information to complete the transaction. When the transaction is complete, or if the prospect decides (at block 214) not to accept the offer, or if the initial recovery attempt fails (at block 208), final information and a parting greeting are provided to the prospect at block 218 (for example, return contact information, and an expression of appreciation for considering the offer). At this time (or above where a jump to point T was indicated) the call is terminated at block 220, and the lines (32-1 and 34-3 in this example) are disconnected. The telemarketing process as to that prospect then ends at end block 299.

At each stage of a call according to exemplary process 200, the agent is provided with scripted text intended to facilitate a successful presentation of the offer. During each phase, different text is available to the agent on display 64. In some circumstances, this command reflects data, a decision, or information provided by the customer. When the agent completes presentation of the material from one display and is ready to proceed with material from another, the agent issues a command using one or more of input devices 63, and computer 62 produces the next display of material to be presented. In some circumstances, this command reflects data, a decision, or information provided by the customer. In other circumstances, the command may reflect a decision by the agent, or simply the completion of the presentation of a screen-full of text. When the presentation moves from one stage to another (for example, from an offer stage at block 210 to a discussion stage at block 212), processor 65 sends a signal to prediction controller 78 of CT server 40 by way of interface device 61 and computer network 52.

Prediction controller 78 accepts the signal from computer 62 at workstation 60a, and accepts similar signals from other workstations 60. Prediction controller 78 also monitors queues 79, IVR system 73, and voicemail system 77 of CT server 40, and uses feedback from each subsystem to optimize the outbound dialing through predictive dialer 71. For example, if a call is in block 106 of FIG. 3A (wherein IVR 73 is providing account information to the user), there is some likelihood that the caller will require the assistance of an agent, but the likelihood is greater when the call is at block 104. Prediction controller 78, therefore, will tend to signal predictive dialer 71 to dial a new outbound call more frequently when an inbound call is at block 106 than when an inbound call is at block 102 in the process shown in FIG. 3A.

Similarly, one might find empirically that the caller on a call at block 126 (in FIG. 3B), who has just been denied credit, is far less likely to purchase suggested add-on services than a customer who has just been approved for additional credit (at block 134 of FIG. 3b). Prediction controller 78 would, therefore, be more likely to trigger a new dialing attempt when an inbound call is at block 126 than when the inbound call is at block 134.

The remaining time during which an agent will be on an outbound call can also be more accurately predicted by considering the substantive phase of the call. Consider two outbound calls, which will be discussed with continuing reference to FIG. 4. In the first call, after the agent's introduction (block 202), the called party immediately reports a lack of interest in speaking with the agent (an affirmative result at decision block 204). The agent attempts to recover the prospect at block 206, but the prospect is not persuaded to listen further (a negative result at decision block 208). As the agent thanks the prospect for taking the call (at block 218), the call is almost sure to end within seconds. In a system according to the present invention, the system can take into account the substantive posture of the call at each of these points and decide accordingly whether to begin to dial another prospect.

In a second exemplary call, after the agent's introduction (at block 202), the prospect expresses an interest in hearing the agent's offer (negative result at decision block 204). The agent explains the offer at block 210, and a discussion of the merits and details of the proposal ensues at block 212. Although the same amount of time may have elapsed in this second call as-it took the first call to reach closing block 218, the second call is likely to remain connected for-a substantial amount of time as the agent and the prospect discuss the offer and, if the prospect accepts, exchange information to complete the transaction. In a system according to this embodiment of the present invention, prediction controller 78 is notified that the agent and prospect are in the discussion phase of the call (block 212) and determines to wait further before attempting to connect a new call to replace the current call. This provides a great advantage over many prior art systems that do not take into account the substantive phase of the call.

In another form of the present invention, the agent uses any suitable input method (such as one or more input devices 63) explicitly to indicate to CT server 40 the substantive progress of the call. Software executed by processor 65 interprets the input and communicates the substantive progress via network 52 to CT server 40. In one embodiment of this form, the agent presses a particular key on a keyboard input device 63 to make that report. In another embodiment, the agent selects one out of a plurality of on-screen icons to make that report.

In yet another form of the present invention, the agent issues commands with input device(s) 63 to navigate prompts presented by computer 62 on display 64. Software executed by processor 65 interprets these navigational commands and, at various points in the script, reports the progress of the call to CT server 40.

In still another form, the prediction controller 78 not only takes into account the last phase of the call reported by the agent, but also the amount of time that has passed since that reporting.

In another embodiment, the prediction controller 78 also operates as a function of a global "aggressiveness" setting that applies to an entire calling campaign.

In still another embodiment, the prediction controller 78 also operates as a function of one or more dynamic properties (e.g., length, age of oldest call, average age of calls, etc.) of the one or more queues.

In yet another embodiment, the system maintains statistics (e.g., average and standard deviation) for each agent that reflect the amount of time ("duration") that the agent spends in a particular call stage. Prediction controller 78 then uses these statistics to determine whether and when to attempt to dial another outbound call. In some of these embodiments, prediction controller 78 also uses collective statistics for all agents in a campaign.

In still other embodiments, instead of (or in addition to) communications being routed through internal lines 34, the communications are routed through network 52 and processed by workstations 60. If the communications are (wholly or partially) in audio form, they may be processed by a sound card or other audio input/output device associated with each workstation 60.

In some embodiments of the present invention, prediction controller 78 is implemented as a software module within the programming for predictive dialer 71.

In other embodiments, prediction controller 78, predictive dialer 71, and/or the software that controls workstations 60 are implemented in one or more modules that can be used in programs written in various languages on various platforms. These can include, for example, programming languages and environments such as Visual Basic, COM (Common Object Model), JAVA, or an application-specific programming or scripting language (such as for a customer relationship management application).

In yet other embodiments, the administrator of system 20 defines call stages that are of interest. Computer 62 at each agent's workstation 60 sends a signal to CT server 40 as the agent enters and/or exits each stage of each active call. In a variation on these embodiments, such progress signals are generated at the entrance/exit of only selected stages.

One embodiment of the invention is an apparatus, comprising a plurality of communication channels; a linking means for predictively establishing communication links via the plurality of communication channels; a telecommunication device linkable with two or more of the plurality of communication channels, wherein the telecommunication device is linked with a first remote party on a first active call via a first one of the plurality of communication channels; and a feedback means for communicating to the linking means a feedback signal that indicates the substantive progress of the first active call, wherein the linking means is operative, based at least in part on the substantive progress indicated by the feedback signal, to attempt to establish a second call to a second remote party via a second one of the plurality of communication channels. In some forms of this embodiment, the plurality of the communication channels comprises one or more telephone lines, and the telecommunication device is an audio communication device. In other forms, the telecommunication device comprises an interactive voice response system. In yet others, the telecommunication device comprises an agent station, comprising an audio communication device linked to at least one of the plurality of communication channels, a video display, and an input device in communication with the feedback means. In certain variations of these forms, the input device allows an agent to send any of a plurality of predetermined status signals to the linking means.

In another aspect, the system includes a computer-readable medium encoded with programming instructions that are executable by a processor in communication with a predictive dialer to connect an agent with an outside party on a first active call, generate a first progress signal that reflects the substantive progress of the first active call on a first one of a plurality of communication channels, and control the predictive dialer as a function of the first progress signal. In a variation of this system, the programming instructions are also executable by the processor to generate a second progress signal that reflects the substantive progress of a second active call on a second one of the plurality of communication channels, and to control the predictive dialer as a function of the first progress signal and the second progress signal. In other variations, the programming instructions are also executable by the processor to accept status input from the agent, and the first progress signal is generated responsively to the status input. In yet other forms of this system, the programming instructions are also executable by the processor to accept script navigation input from the agent and control the display of script information responsively to the script navigation input, and the first progress signal is generated responsively to the script navigation input. In variations of this form, the programming instructions are also executable by the processor to generate a third progress signal based on the passage of time after the generation of the first progress signal. In yet other variations on this system, the programming instructions are further executable by the processor to generate a fourth progress signal that reflects further substantive progress of the first active call.

What is claimed is:

1. An apparatus, comprising:
   a plurality of communication channels;
   a linking means for predictively establishing communication links via said plurality of communication channels;
   a telecommunication device linkable with two or more of said plurality of communication channels; wherein said telecommunication device is linked with a first remote party on a first active call via a first one of said plurality of communication channels; and
   a feedback means for communicating to said linking means a feedback signal that indicates the substantive progress of said first active call;
   wherein said linking means is operative, based at least in part on the substantive progress indicated by said feedback signal, to attempt to establish a second call to a second remote party via a second one of said plurality of communication channels.

2. The apparatus of claim 1, wherein:
   said plurality of communication channels comprises one or more telephone lines; and
   said telecommunication device is an audio communication device.

3. The apparatus of claim 1, wherein said telecommunication device comprises an interactive voice response system.

4. The apparatus of claim 1, wherein said telecommunication device comprises an agent station comprising:
   an audio communication device linked to at least one of said plurality of communication channels;
   a video display; and
   an input device in communication with said feedback means.

5. The apparatus of claim 4, wherein said input device allows an agent to send any of a plurality of predetermined status signals to said linking means.

6. A system, comprising a computer-readable medium encoded with programming instructions that are executable by a processor in communication with a predictive dialer, to:
   connect an agent with an outside party to establish a first active call;
   generate a first progress signal that reflects the state, among a plurality of states, of a discussion between the agent and the outside party as determined with reference to the content of the discussion, on a first one of the plurality of communication channels; and
   control the predictive dialer as a function of the first progress signal.

7. The system of claim 6, said programming instructions being further executable by said processor to:
   generate a second progress signal that reflects the substantive progress of a second active call on a second one of the plurality of communication channels; and
   control the predictive dialer as a function of the first progress signal and the second progress signal.

8. The system of claim 6:
   said programming instructions being further executable by said processor to accept status input from the agent; and
   wherein said first progress signal is generated responsively to the status input.

9. The system of claim 6:
   wherein said programming instructions are further executable by said processor to:
     accept script navigation input from the agent; and
     control the display of script information responsively to the script navigation input; and
   wherein said first progress signal is generated responsively to the script navigation input.

10. The system of claim 9, said programming instructions being further executable by said processor to generate a third progress signal based on the passage of time after generation of the first progress signal.

11. The system of claim 6, said programming instructions being further executable by said processor to generate a fourth progress signal that reflects further substantive progress of the first active call.

12. A method of controlling a predictive dialer in a communications center, comprising:

connecting an agent to an outside party to create an active call in which the agent and the outside party engage in a discussion;

determining a current state, among a plurality of states, of the discussion between the agent and the outside party, as determined with reference to the content of the discussion; and controlling the predictive dialer based on the current state of the active call.

13. The method of claim 12, wherein at least one of the plurality of states is an offer phase of the discussion.

14. The method of claim 12, wherein at least one of the plurality of states is a question-and-answer phase of the discussion.

15. The method of claim 12, wherein at least one of the plurality of states is a closing phase of the discussion.

16. The method of claim 12, wherein at least one of the plurality of states is an acceptance phase of the discussion.

17. The method of claim 12, wherein the determining step comprises inferring the current state from data entry by the agent.

18. The method of claim 12, further comprising associating each of the plurality of states with one of a plurality of predetermined progress values; and wherein the determining step comprises selecting a current value from the plurality of predetermined progress values that indicates the current phase of the active call.

19. The method of claim 12, further comprising generating a duration value related to the length of time that the active call is in a particular one of the plurality of states.

20. The method of claim 19:

further comprising analyzing the duration value for each call in a plurality of calls to yield an accumulated duration output value; and wherein said controlling is based on the accumulated duration output value.

21. The method of claim 20, wherein the plurality of calls are handled by the same agent among a plurality of agents.

22. The method of claim 20:

further comprising collecting the duration values for a plurality of calls handled by a plurality of agents to yield a collective duration output value; and wherein said controlling is also based on the collective duration output value.

23. The method of claim 20, wherein said duration output value is the average, over the plurality of calls, of the length of time that the call is in a particular one of the plurality of the predetermined call phases.

24. The method of claim 20, wherein said duration output value is the standard deviation, over the plurality of calls, of the length of time that a call is in a particular one of the plurality of predetermined call phases.

25. The method of claim 12, further comprising accepting inbound calls, and placing the inbound calls into one or more queues; wherein said controlling is also based on one or more dynamic properties of the one or more queues.

26. The method of claim 25, further comprising, when the predictive dialer connects an outbound call to a third party, but no agent is available to handle the outbound call, placing the outbound call in at least one of the one or more queues.

27. A scripting system for use in an agent workstation in a call center having a predictive dialing system, the workstation comprising:

a means for receiving telephone calls, each connected to a telephone respondent by the predictive dialing system; and a display means; the scripting system comprising:

a means for providing signals effective to cause the display means to display a script for prompting an agent in a telephone call with the telephone respondent;

a means for producing status signals representative of the progression of the agent through the script; and a means for sending said status signals to the predictive dialing system.

28. In a system having a predictive dialer and a plurality of agent stations, the improvement comprising:

a signal from a first one of the agent stations that indicates the substantive content of the discussion between an agent at the first one of the agent stations and a third party;

wherein the predictive dialer determines whether to dial additional calls as a function of the signal.

* * * * *